June 18, 1957 J. H. WORTHEN 2,795,855
AIR GAUGE
Filed May 12, 1954
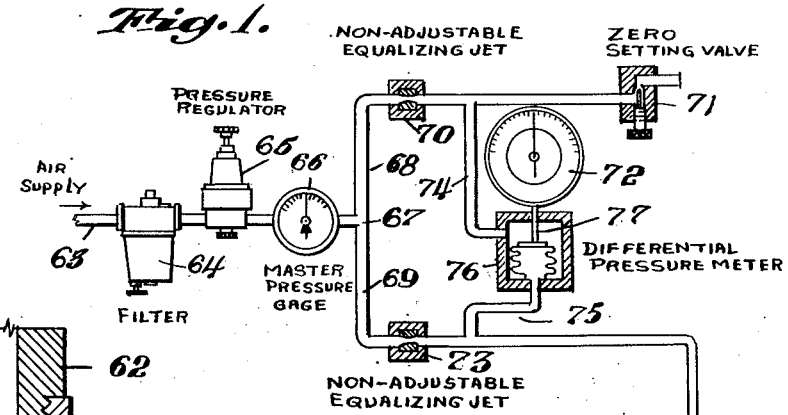
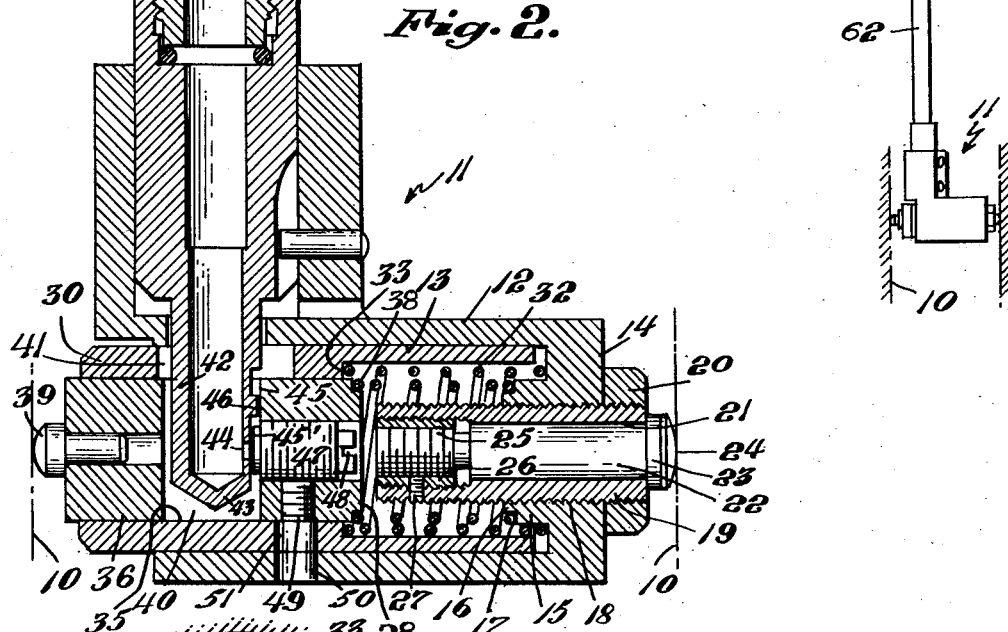
INVENTOR.
John H. Worthen
BY
Barlow & Barlow
ATTORNEYS.

United States Patent Office 2,795,855
Patented June 18, 1957

---

2,795,855

AIR GAUGE

John H. Worthen, Warwick Neck, R. I., assignor to Federal Products Corporation, a corporation of Rhode Island Application May 12, 1954, Serial No. 429,312

3 Claims. (Cl. 33—178)

This invention relates to a gauge for large magnification of measurement by the use of air and is referred to as an air gauge.

One of the limitations in an air gauge has been the mechanical transfer of motion from one point to another in indicating the change of position of the members which contact the work.

One of the objects of this invention is to locate the jet opening for the air so that motion need not be transmitted through mechanical linkages and the like.

Another object of the invention is to locate the air jet opening so that the air is directed along the axial line between the measuring points and that there need be no mechanical transfer of motion to some other location.

Another object of the invention is to so arrange the work contacting parts that they are concentric and centralized with reference to and are guided along an axis between the measuring members.

With these and other objects in view, the invention consists of certain novel features of construction as will be more fully described and particularly pointed out in the appended claims.

In the accompanying drawings:

Figure 1 is a diagrammatic view illustrating the arrangement of the air gauge;

Figure 2 is a sectional view on a much larger scale than the corresponding parts in Figure 1 showing the arrangement of the parts;

Figure 3 is a section of a modified plug substantially centrally through the gauging mechanism as shown in Figure 2 but on a much smaller scale.

In proceeding with this invention, I have provided a frame in which there is a guiding bore. A reference contact may be adjusted axially of this bore and held in any position fixed with reference to the frame. A centralizing member is guided in the bore, and within the centralizing member there is positioned a plug which carries a sensitive contact which will be movable axially of the bore, the plug being guided along the line of the axis of the bore. The plug is recessed and receives the air conduit into the recess so that it may have a jet opening from this conduit directed along the axial line of this guiding bore and along the axis between the reference contact member and the sensitive contact member. Thus, as movement of the sensitive contact occurs, varying restrictions of the jet opening are provided, and no transfer of motion through linkages or the like is necessary.

With reference to the drawings, in the diagrammatic view shown in Figure 1 the bore to be gauged is designated 10, and the head of the apparatus for determining the measurement of this bore 10 is designated generally 11 at the end of an air conduit designated generally 62.

The arrangement of this apparatus is such that air is supplied at the conduit 63 and passes through a filter 64 and thence through a pressure regulator 65 and master gauge 66. The air is then divided at 67 so as to pass through branch 68 and branch 69. In branch 68 the air passes through a non-adjustable equalizing jet 70 and thence out through a valve 71 which may be adjusted so as to cause the indicator 72 to be positioned as desired, such for instance as at zero. In the branch 69 air passes through the non-adjustable master jet 73 and thence to the conduit 62 which is connected to the gauging head designated generally 11. A connection is made across the two branches by means of conduit 74 entering branch 68 and conduit 75 entering branch 69, and a differential pressure meter 76 is interposed in this line 74—75, and any differential of pressure will be transmitted to the indicator 72 through the stem 77. Thus, when the zero setting is set so that there is substantially the same escape of air at the valve 71 as there is in the gauging head 11, the indicator 72 will read zero. If now the air escapes faster through the gauging head 11, then this differential of pressure will be shifted and will show on the indicator 72.

This invention deals primarily with the mechanism in the gauging head 11, which comprises a frame 12 having a bore 13 extending inwardly from one side of the frame to a point short of the other end so as to provide an end wall 14. A collar 15 extends inwardly from this end wall 14 and is reduced at its free end as at 16 to provide a shoulder 17. A threaded bore 18 extends through this end wall 14 and collar 15 and receives the threaded bushing 19 which may be adjustably secured in any desired position to remain fixed with reference to the frame 14 by means of a check nut 20. The bushing 19 has a bore 21 in which there is inserted the shank 22 of the reference contact member having head 23 with rounded outer surface 24. The inner end of this shank is threaded as at 25, and a sleeve 26 engages it and threads in bushing 19 to draw the head 23 into snug engagement with the bushing. This shank may be held in position by the set screw 27 threaded through the bushing 19.

A centralizing device 30 has a cylindrical outer surface which is closely slidably guided in the bore 13 of the frame and has surfaces 31 concentric with the axis of the bore 13 for engagement with the wall of the bore 10 of the work to be gauged. This centralizing device is forced away from the reference contact 24 by a spring 32 which encircles the collar 15 and engages the inner surface of the end wall 14 and also engages the shoulder 33 of the centralizing device 30. This compression spring forces the centralizing device outwardly of the bore as indicated so as to locate and centralize the device in the opening in the work to be gauged. The centralizing device also has a bore 35, which is concentric with its outer surface and therefore has its center on the axis of the bore 13, which receives the plug 36 which closely fits and is slidably guided in this bore 35. This plug has a boss 28 and receives a spring 38 which has one end engaging the shoulder 17 of the collar 15, while the other end engages the bottom of the shoulder about the boss 28 so that when under compression it will force the plug 36 away from the reference contact 23.

This plug is part of the sensitive work contact and carries the sensitive contact button which actually engages the work and which is designated 39, which has a forced friction fit with the plug as is shown in Figures 2 and 3. A recess 40 extends through the plug 36, while a recess 41 extends through the centralizing device, and into these recesses there extends the air conduit 42 which conveys the air from the conduit 62 thereinto. This conduit is closed at its end 43 and is provided with a jet opening 44 which directs air outwardly of the conduit and in line with the axis of the bore 13 and consequently the axis between the reference contact and sensitive contact 23 and 39. This conduit 42 is fixed, and the wall 45 of the recess 40 against which the air jet is directed will restrict the exit of the air from the jet 44 depending upon how close it is to the edge of the jet opening 44. Thus, the further away the wall 45 is from the jet opening 44, the less the air will be restricted and the greater will be the differential in pressure indicated on the dial 72. In order that the jet opening will not be completely closed, the conduit 42 has a projection 46 thereon against which this wall 45 will engage at such a location that the opening 44 will remain slightly open. In order that there may be an adjustment as to the surface adjacent to the jet, the wall 45 is adjustable by reason of a screw 47 inserted in the plug 36 so that its surface 45′ may be changed with reference to the plug as a whole, thus providing the wall adjustable with reference to the plug and enabling closer control of the parts of the mechanism. This screw 47 is accessible by removal of the reference contact 22 and the bushing 19 in which it is mounted so that its slotted head 48 may be reached by a screw driver. This screw is held in place by a set screw 49 accessible through openings 50 in the frame and 51 in the centralizing device at one relative position of these parts so as to hold the screw 47 in position.

In Figure 3 a section of a modified head 11 is shown permitting of a more compact head and one which will serve for gauging a smaller bore. In this case the plug 36′ is modified in that instead of a boss 28 being provided on its end for engagement with the spring, there is a recess 37 into which the spring 38 may fit. In this case the spring surrounds the shank 19′ which is somewhat shorter than the shank 19 in the larger structure shown in Figure 2. This smaller plug 36′ also omits the adjustable wall formed by the insert 47 in the larger construction. The other parts of the structure of Figure 3 are substantially as heretofore described and shown in Figure 2.

As the bore 10 is gauged, a movement inwardly of the plug 36 will permit a greater amount of air to escape through the jet 44 and thus give a reading on the indicator 72 of greater amounts of air passage which may be calibrated. As the spring forces the plug 36 outwardly to indicate a bore of relatively greater size, the wall 45 will cause more restriction of the air jet 44 and thus will limit the escape of air, and this differential will be correspondingly registered on the indicator 72.

Magnification in the range of 5000 to 1 and up may be effected by an instrument of this character, and by reason of there being no transfer of motion through linkages, great accuracy is provided.

I claim:

1. In an air gauge, a frame having a bore therein, a reference contact member secured to the frame with its work contacting surface on the axis of said bore, a centralizing device having a cylindrical portion closely fitting and slidable in said bore and having its outer end presenting work contacting surfaces at diametrically opposite sides of and along a circle concentric with said axis, a spring to urge said device away from said reference contact member, said centralizing device having an opening therein symmetrical with said axis, a plug in said opening and guided thereby, a sensitive contact member carried by said plug and having a work contacting surface on the axis of said bore, said plug having a recess therein, a fixed air conduit extending loosely into said recess and having a jet opening on the axis of said bore directing air against the wall of said recess and in the direction of said axis and escaping from the jet in accordance with the distance said wall is from said jet.

2. In an air gauge as in claim 1 wherein the wall of said recess toward which said jet is directed is adjustable with reference to said plug.

3. In an air gauge as in claim 1 wherein the wall of said recess toward which said jet is directed is adjustable with reference to said plug by this portion of the wall of said recess being threaded into the plug.

References Cited in the file of this patent

UNITED STATES PATENTS

| | | |
|---|---|---|
| 1,591,260 | Ames | July 6, 1926 |
| 2,266,566 | Poole | Dec. 16, 1941 |
| 2,385,157 | Nilsson et al. | Sept. 18, 1945 |
| 2,490,375 | Rupley | Dec. 6, 1949 |
| 2,504,212 | Menneson | Apr. 18, 1950 |
| 2,539,624 | Huggenberger | Jan. 30, 1951 |